United States Patent
Mezghani et al.

(10) Patent No.: US 10,713,398 B2
(45) Date of Patent: Jul. 14, 2020

(54) ITERATIVE AND REPEATABLE WORKFLOW FOR COMPREHENSIVE DATA AND PROCESSES INTEGRATION FOR PETROLEUM EXPLORATION AND PRODUCTION ASSESSMENTS

(71) Applicant: Saudi Arabian Oil Company, Dhahran (SA)

(72) Inventors: Mokhles Mustapha Mezghani, Dhahran (SA); Nazih F. Najjar, Dhahran (SA); Mahdi AbuAli, Dhahran (SA); Rainer Zuhlke, Dhahran (SA); Sedat Inan, Dhahran (SA); Conrad K. Allen, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 602 days.

(21) Appl. No.: 15/162,205

(22) Filed: May 23, 2016

(65) Prior Publication Data

US 2017/0337302 A1    Nov. 23, 2017

(51) Int. Cl.
| | | |
|---|---|---|
| G06F 30/20 | (2020.01) | |
| G06F 30/17 | (2020.01) | |
| G01V 99/00 | (2009.01) | |
| G01V 1/30 | (2006.01) | |
| G01V 1/28 | (2006.01) | |

(52) U.S. Cl.
CPC ............ *G06F 30/20* (2020.01); *G01V 99/005* (2013.01); *G06F 30/17* (2020.01); *G01V 1/282* (2013.01); *G01V 1/301* (2013.01); *G01V 1/306* (2013.01); *G01V 2210/614* (2013.01); *G01V 2210/6163* (2013.01); *G01V 2210/6167* (2013.01); *G01V 2210/6169* (2013.01); *G01V 2210/624* (2013.01); *G01V 2210/64* (2013.01); *G01V 2210/66* (2013.01)

(58) Field of Classification Search
CPC . G06F 17/5009; G06F 17/5086; G01V 11/00; G01V 2210/66
See application file for complete search history.

(56) References Cited

U.S. PATENT DOCUMENTS

| | | | |
|---|---|---|---|
| 6,480,790 B1 * | 11/2002 | Calvert | ................. G01V 1/282 |
| | | | 702/14 |
| 6,980,940 B1 | 12/2005 | Gurpinar et al. | |

(Continued)

OTHER PUBLICATIONS

Manish Choudhary and Tapan Mukerji Generation of Multiple History Matched Models Using Optimization Technique 25th Annual SCRF Meeting (Year: 2012).*

(Continued)

*Primary Examiner* — Rehana Perveen
*Assistant Examiner* — Chuen-Meei Gan
(74) *Attorney, Agent, or Firm* — Fish & Richardson P.C.

(57) ABSTRACT

A global objective function is initialized to an initial value. A particular model simulation process is executed using prepared input data. A mismatch value is computed by using a local function to compare an output of the particular model simulation process to corresponding input data for the particular model simulation process. Model objects associated with the particular model simulation process are sent to another model simulation process. An optimization process is executed to predict new values for input data to reduce the computed mismatch value.

13 Claims, 5 Drawing Sheets

(56) References Cited

U.S. PATENT DOCUMENTS

| | | | |
|---|---|---|---|
| 8,335,677 | B2 | 12/2012 | Yeten et al. |
| 8,676,557 | B2 | 3/2014 | Ding et al. |
| 8,793,111 | B2 | 7/2014 | Tilke et al. |
| 8,849,623 | B2 | 9/2014 | Carvallo et al. |
| 2002/0177955 | A1 | 11/2002 | Jalali et al. |
| 2007/0016389 | A1 | 1/2007 | Ozgen |
| 2012/0253770 | A1* | 10/2012 | Stern ............... G01V 11/00 703/10 |
| 2014/0214387 | A1* | 7/2014 | Tilke ............... E21B 43/305 703/10 |
| 2014/0303951 | A1* | 10/2014 | Houeto ............ E21B 43/00 703/10 |
| 2015/0081265 | A1* | 3/2015 | Kauerauf ......... G06F 17/5009 703/10 |
| 2015/0153476 | A1* | 6/2015 | Prange ............. E21B 43/00 703/2 |
| 2017/0091636 | A1* | 3/2017 | Polyakov ......... G06Q 10/0633 |

OTHER PUBLICATIONS

Mixed integer simulation optimization for optimal hydraulic fracturing and production of shale gas fields J.C. Li, B. Gong & H.G. Wang pp. 1378-1400 | Accepted Oct. 13, 2015, Published online: Dec. 10, 2015 Journal Engineering Optimization vol. 48, 2016—Issue 8 (Year: 2015).*

Jichao Yin et al, A hierarchical streamline-assisted history matching approach with global and local parameter updates Journal of Petroleum Science and Engineering 80 (2012) 116-130 (Year: 2012).*

Tarantola, "Inverse Problem Theory and Methods for Model Parameter Estimation," Society for the Industrial and Applied Mathematics (SIAM), published 2005; Chapter 3, pp. 57-80.

Abu-Ali et al., "Paleozoic petroleum systems of Saudi Arabia: a basin modeling approach," Geo Arabia, vol. 10, No. 3, published 2005; pp. 131-168.

Tissot et al., "Petroleum Formation and Occurrence," Springer-Verlag Berlin Heidelberg, published 1984, 2nd edition; Chapter 26, pp. 1-33.

Zhang et al., "Evolutionary Computation and Its Applications in Neural and Fuzzy Systems," Applied Computational Intelligence and Soft Computing, vol. 2011, No. 7, Jan. 2011; 20 pages.

Van Laarhoven et al., "Simulated Annealing: Theory and Applications," Mathematics and Its Applications (Book 37), Springer Netherlands, 1987 edition; Chapters 1-2, pp. 1-15.

Goldberg, "Genetic Algorithms in Search, Optimization, and Machine Learning," Addison-Wesley Longman Publishing Co., Inc., Boston, MA, published 1989; Chapter 1, pp. 1-25.

Sivanandam et al., "Introduction to Genetic Algorithms," Springer-Verlag Berlin Heidelberg, published 2008; Chapter 2, pp. 15-36.

Caeiro et al., "Geostatistical Modeling of Complex Deltaic Reservoirs Integrating Production Data through Optimized History Matching," SPE 177813, Abu Dhabi International Petroleum Exhibition and Conference, Nov. 12, 2015, Abu Dhabi, UAE; 14 pages.

Schepers et al., "Optimized Reservoir History Matching Simulation of Canyon Formation, SACROC Unit, Permian Basin," Topical Report, Department of Energy, Nov. 9, 2007; 79 pages.

Yin et al., "A hierarchical streamline-assisted history matching approach with global and local parameter updates," Journal of Petroleum Science and Engineering, vol. 80, No. 1, Dec. 2011; pp. 116-130.

Cullick et al., "Improved and more-rapid history matching with a nonlinear proxy and global optimization," SPE 101933, SPE Annual Technical Conference and Exhibition, vol. 2, Sep. 24, 2006, San Antonio, TX; pp. 728-740.

International Search Report and Written Opinion issued in International Application No. PCT/US2017/020858 dated Jun. 26, 2017.

European Communication Pursuant to Rules 161(1) and 162 EPC issued in European Application No. 17712315.5 dated Jan. 8, 2019, 3 pages.

Gulf Cooperation Council Examination Report issued in GCC Application No. GC 2017-33222 dated Dec. 20, 2018, 4 pages.

Gulf Cooperation Council Examination Report issued in GCC Application No. GC 2017-33222 dated Apr. 21, 2019, 4 pages.

Gulf Cooperation Council Examination Report issued in GCC Application No. GC2017-33222 dated Sep. 25, 2019, 3 pages.

GCC Examination Report in GCC Appln. No. GC 2017-38334, dated Mar. 26, 2020, 4 pages.

* cited by examiner

ITERATIVE AND REPEATABLE WORKFLOW FOR COMPREHENSIVE DATA AND PROCESSES INTEGRATION FOR PETROLEUM EXPLORATION AND PRODUCTION ASSESSMENTS

BACKGROUND

Numerical models of several processes (for example, physical, chemical, geo-mechanical, etc.) are frequently used in the oil and gas industry to optimize petroleum exploration and production activities. These numerical models are frequently used to identify and screen new prospects, to optimize recovery mechanisms, and to design optimal surface facilities, hence improving net present values (NPV). The challenge of optimizing exploration and production activities using numerical modeling is in having accurate model predictions with acceptable uncertainty tolerance for use in the decision making process. Unfortunately, predictions from current process-based numerical models include major uncertainties; meaning any decision-making process is inherently risky and often results in increased petroleum exploration and production costs.

SUMMARY

The present disclosure describes methods and systems, including computer-implemented methods, computer-program products, and computer systems for optimization of petroleum exploration and production activities using numerical modeling.

In an implementation, a global objective function is initialized to an initial value. A particular model simulation process is executed using prepared input data. A mismatch value is computed by using a local function to compare an output of the particular model simulation process to corresponding input data for the particular model simulation process. Model objects associated with the particular model simulation process are sent to another model simulation process. An optimization process is executed to predict new values for input data to reduce the computed mismatch value.

The above-described and other implementations are implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions stored on the non-transitory, computer-readable medium.

The subject matter described in this specification can be applied in particular implementations so as to realize one or more of the following advantages. First, the new workflow will link important modeling approaches for predictive a) source/reservoir/seal analysis; b) maturation/migration/charging/trapping analysis; and c) production engineering d) recovery processes. Second, integrated predictive approaches can decrease exploration and production risks and increase resources and production. Third, global objective function based on incremental uncertainties from each modeling approach provides improved predictions; allowing improved calibration and verification of input parameter sets to each modeling approach. Fourth, the workflow provides a hydrocarbon (HC) exploration and production community shared model in contrast to isolated numerical models of individual and inconsistent elements of the HC system. Fifth, the results of individual process, overall workflow, or a combination of both individual processes and the workflow, can have the following positive impacts: 1) improved well operations in terms of well placement and real-time geo-steering; 2) highly predictive 3D numerical reservoir models; efficient dynamic flow simulation with minimal changes to model parameters during the production history matching process; and enhanced reservoir and field performance predictions 3) optimal recovery processes. Sixth, uncertainties can be reduced on the models prediction used in both exploration and production to increase discovery and enhance recovery. Seventh, the prediction accuracy of generated models can be compared to current models to determine, among other things, model efficiency and to allow substitution of old models with current models. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1A:
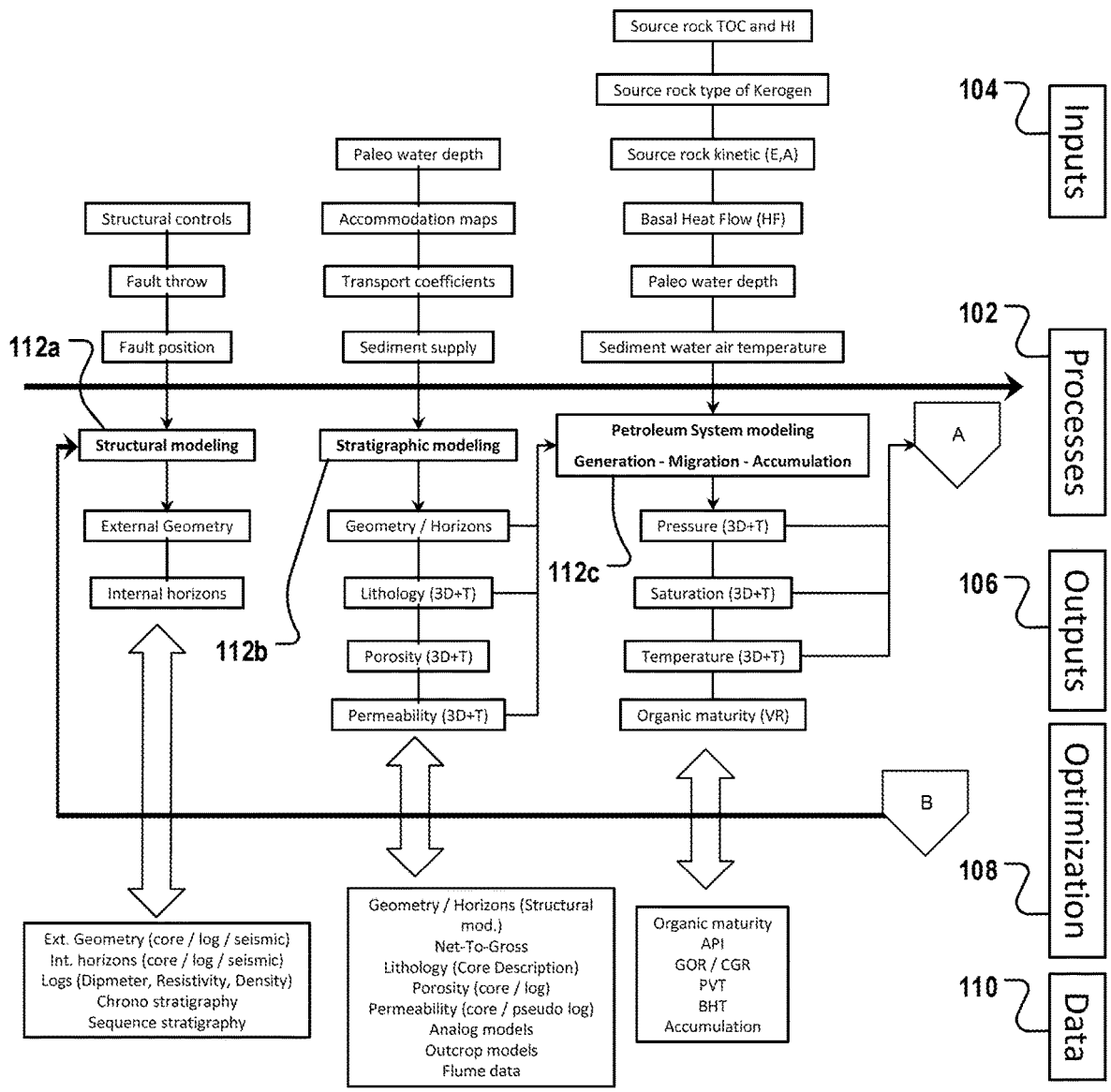
FIGS. 1A & 1B illustrate a block diagram of an example workflow for optimization of petroleum exploration and production activities using numerical modeling according to an implementation.

This disclosure generally describes optimization of petroleum exploration and production activities using numerical modeling and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

Numerical models of several processes (for example, physical, geophysical, chemical, mechanical, etc.) are frequently used in the oil and gas industry to optimize petroleum exploration and production activities. These numerical models are frequently used to identify and screen new prospects, to optimize recovery mechanisms, and to design optimal surface facilities, hence improving net present values (NPV).

The challenge of optimizing exploration and production activities using numerical modeling is in having accurate model predictions with acceptable uncertainty tolerance for use in the decision making process. Unfortunately, predictions from current process-based numerical models include major uncertainties; meaning any decision-making process is inherently risky and often results in increased petroleum exploration and production costs. The prediction accuracy deficiency of these models is mainly due to two related factors:

1. The efficient way to enhance model prediction accuracy is to constrain the model result by the observed historical data; for example using inverse modeling techniques. Lack of clear and efficient methodology to conduct inverse modeling is always pushing reservoir engineers to take shortcuts at the expense of model prediction accuracy; only a few types of data are used to constrain the model neglecting a large amount of data collected from laboratories, field measurement, and new technologies (for example, e-field, nanotechnology, remote sensing, etc.), and
2. Historical data integration is usually conducted inconsistently. For example, processes are assumed to be independent from each other; therefore each model is updated individually without considering its dependence on other models.

Prior optimization methods suffered from ill-defined workflows, where, for example, petroleum system and basin modelers were required to dig for data/information and establish input(s) for their models. In some cases, the modelers were not aware of the details and the assumptions of the input they used. Consequently, sub-optimal work was often created, and results of modeling, as well as the quality of observation data, needed verification.

This disclosure describes integrating all processes leading to successful discoveries of, or of enhanced recoveries from, hydrocarbon accumulations; enabling integration of multi-disciplinary and multi-lateral work toward one single aim. This integration results in savings of time and effort of professionals and researchers and benefitting a user (for example, a petroleum company). In the scope of this disclosure, close collaboration is envisioned between, but not limited to, reservoir geologists, structural geologists, paleontologists, stratigraphers, seismic data processing experts, seismic interpreters, reservoir geophysicists, geochemists, formation evaluation experts, petrophysicists, reservoir simulation experts, and other experts consistent with the disclosure and described subject matter.

This disclosure proposes a new data-driven workflow where various processes involved in, for example, rock formation, petroleum generation, migration, charging, and production are consistently connected to each other, accounting for their relative dependency. As such, each considered process is characterized by its inputs and outputs.

The connection between processes is largely established through characterized inputs and outputs, where outputs of one process are partly inputs of a following process. The output of each process is then systematically compared to available data and a mismatch function for a current process (for example, a local objective function) is evaluated at the end of each process to update a global objective function for the entire workflow. In some implementations, a standard unified input/output format can be defined to be used for some or all of the processes and associated software tools used in the workflow. In some implementations, a converter can be used to convert an output format from one process to an input format needed by a following process(es).

In typical implementations, prior to running the described new data-driven workflow, a set of input parameters to be optimized are specified. While running the workflow, typically only specified parameters are changed and outputs change accordingly as a result of running a processes simulation with the specified parameters.

One iteration of the workflow starts by setting a new set of parameters/inputs provided by an optimizer. In typical implementations, each process in the data-driven workflow provides the above-mentioned local objective function that measures a mismatch between a simulation process prediction and observed data. Once all the processes in the workflow are simulated, all the local objective functions can be added together to form a global objective function that will be minimized (for example, according to a certain weight in some implementations).

In some implementations, a general formulation for the global objective function can be:

$$J(P) = \frac{1}{2}\sum_{i=1}^{n_p} w_i J_i^L(P),$$

where:
  $J_i^L(P)$ is the local objective function,
  $w_i$ is a weighting factor to account for the uncertainty on the data/measurement for the concerned local process, and
  $n_p$ is the total number of processes.

Data with high uncertainty will be assigned a low weighting factor $w_i$. Data with low uncertainty will be assigned a high weighting factor $w_i$. Missing data will be assigned a zero weighting factor $w_i$. Ideally, weighting factor $w_i$ must be normalized between zero and one.

In some implementations, a general formulation for the local objective function can be based on the Euclidian Norm:

$$J_i^L(P) = \frac{1}{2}\|O_i^L - S_i^L\|_E^2 = \frac{1}{2}\|O_i^L - F_i^L(P)\|_E^2,$$

where:
  $O_i^L \in \mathcal{R}^m$ is the set of observation for the local process number i,
  $S_i^L \in \mathcal{R}^m$ is the set of simulation results for the local process number i, and
  $F_i^L : \mathcal{R}^n \to \mathcal{R}^m$ is the non-linear operator describing the various processes involved in the workflow.

Depending on the process, $O_i^L$ could be: bottom-hole pressure from well gauge, oil rate from separator, grain size from thin section analysis, lithology from core description, 2-3D seismic attributes (for example, acoustic impedance), porosity log, formation thickness, etc.

In some implementations, a particular formulation of the local objective function is called the least square formulation using the $L^2$ Norm:

$$J_i^L(P) = \frac{1}{2}\sum_{j=1}^{m_i} \frac{(O_{ij}^L - F_{ij}^L(P))^2}{\sigma_{ij}^2},$$

where:

$\sigma_{ij}$ is a real value that represents the standard deviation on the data measurement, $m_i$ is the number of measurement for the process number i, and $F_{ij}^L : \mathcal{R}^n \rightarrow \mathcal{R}^{m_i}$ is the non-linear operator describing the processes number i involved in the workflow.

In typical implementations, the global objective function is minimized through an automated loop to generate lowest uncertainty models that can explain available data without adversely impacting consistency in the models. One of the challenges faced in global objective function minimization is a choice and implementation of a global optimization technique to obtain a "best" model. Both standard/known and custom optimizers can be used in various implementations. Optimizers can be benchmarked in ways known to those of ordinary skill in the art to determine which optimizer provides a "best" global objective function minimization. It is expected that a gradient-based optimizer will generally produce the best results, but in some implementations, variations in data, functions, etc. can impact optimizer function. In some implementations, threshold values can be used to compare values generated by local/global objective functions to determine whether the global objective function is minimized and generates lowest uncertainty models that can explain available data without adversely impacting consistency in the models.

Figure 1B:
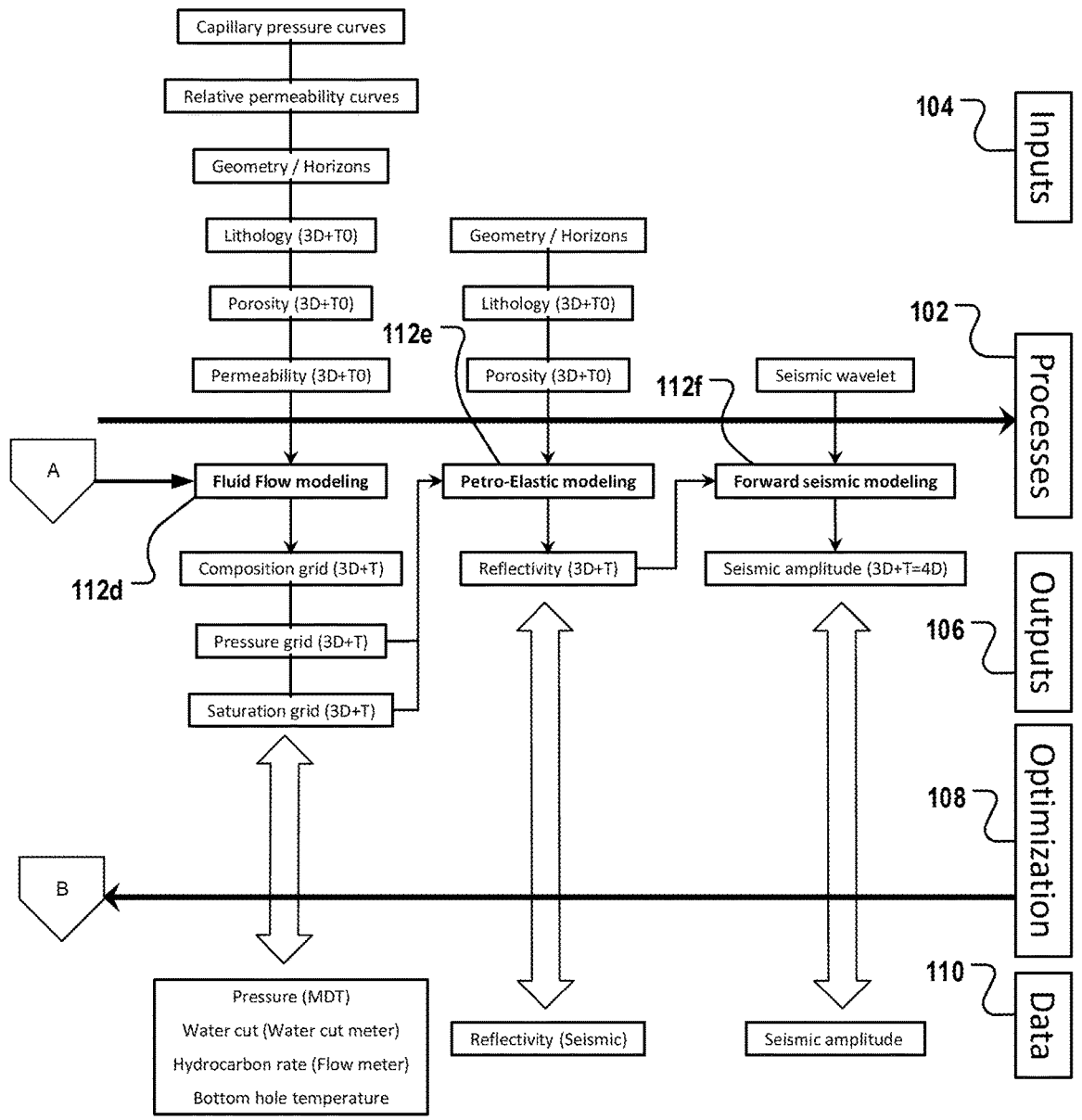

FIGS. 1A & 1B illustrate a block diagram of an example workflow 100 for optimization of petroleum exploration and production activities using numerical modeling according to an implementation. Illustrated are various workflow processes 102, inputs 104, outputs 106, optimization loop 108, and data 110 related to the example workflow 100.

Workflow Overview

The workflow 100 is typically based on inverse problem theory: uncertain inputs involved in describing an observable system (using numerical modeling) are optimized to minimize mismatches between model simulation results and system observation results.

Any inverse problem typically includes two components:
1. Forward (Composite) Modeling: Parameters are assumed to be known and a numerical simulation is conducted to obtain the corresponding simulated "observations," and
2. Inverse Modeling: System observations are assumed to be known and several numerical simulations are conducted (non-linear case) to determine the parameter values.

Forward (Composite) Modeling

Forward (composite) modeling is typically quite complex and formed by a succession of fundamental modeling components (for example, processes 102) connected to each other to form a composite modeling step. Each modeling component is characterized by its inputs and outputs.

In typical implementations, for each fundamental modeling component, the following steps are executed:
1. Prepare model inputs,
2. Identify parameters to be optimized,
3. Run a process simulation,
4. Compare simulation outputs to corresponding data and compute any mismatch value,
5. Update a global objective function by adding any computed mismatch to the global objective function,
6. Send simulation results to an optimizer for archiving, and
7. Send model objects (for example, inputs and outputs) needed by other models to preserve the model's dependency.

In typical implementations, inputs can be of two classes:
1. Hard inputs (observed data): These are inputs assumed to be well known (for example, a rock type) and will not be changed and optimized during inverse modeling, or
2. Soft inputs: These are inputs with a high level of uncertainty. For example, these inputs can be either results of assumptions (for example, paleo-heat flow) or outputs from other fundamental modeling components. Due to their inherent uncertainties, soft inputs are allowed to vary during the inverse modeling process to minimize the mismatch between the simulation results and the system observations. Owing to computational considerations, the number of soft inputs that can be optimized are typically kept as small as possible. During the inverse modeling process, the forward modeling is performed several times to improve a match between simulation and observation. How often forward modeling is performed depends on the number of soft inputs that need to be optimized. Parameterization techniques are usually introduced to reduce a number of inputs (for example, few parameters are required to represent a complex property, such as a curve, surface, volume, etc., by using analytical expressions, zonation, etc).

Outputs of a fundamental modeling component are used as inputs for other fundamental modeling component(s) when it is possible to preserve consistency between models. When the outputs represent an observable quantity that can be measured, any mismatch between the output and the observation must be added to the global objective function. In some implementations, upscaling and downscaling techniques might be needed to fill a gap between the model scales and observation scales.

Typically, objective function minimization is an iterative process (for example, a typical forward model is highly non-linear). Optimization loop 108 uses an optimizer to identify best parameters/inputs that minimize any computed mismatch between process prediction and measured data 110. Because of the non-linearity, several optimization iterations are typically needed to converge to an acceptable solution. As will be appreciated by those of ordinary skill in the art, a number of iterations can vary depending on, for example, data, functions, or other parameters. At each iteration, the optimizer will estimate a new parameters/inputs set guided by the gradients values of the global objective function.

Evaluated parameters/inputs will depend on a particular process 102 of the workflow 100. Note that the illustrated parameters in FIGS. 1A and 1B are for example purposes only. For example, considering geology for a field/basin, different parameters may be used/needed. Generally a sensitivity analysis is conducted prior to running a particular workflow to decide on appropriate parameters for the workflow. The sensitivity analysis is the study and determination of how a change in a given input parameter influences the output in the model. For example, in one implementation, parameters/inputs for each process 102 can include:

Structural modeling 112a: fault throw (vertical, lateral), curvature, strain rate, normal & shear stress, rheology (per layer, for example, values for Young's modulus, Poisson's ratio), Stratigraphic modeling 112b: water depth, subsidence/uplift, accommodation (as undifferentiated product of the two), sediment flux (if more specific: growth rate vs. light penetration depth for carbonates, density sediment vs. density water for elastics), Petroleum systems modeling 112c: kerogen type, heat flow, heat conductivity (per layer), water depth, surface temperature, porosity/permeability (per layer), stress field (for example, shortening rate), Fluid Flow modeling 112d: fluid & gas viscosity, porosity, permeability, vertical connectivity coefficient, lateral continuity coefficient (partly overlaps with parameters for petroleum systems modeling), leakage factor, Petro-Elastic modeling 112e: strain rate, stress rate (partly identical to structural modeling), and Forward seismic modeling 112f: velocity, density, impedance (as undifferentiated product of the two), porosity, clay content, fluid type, saturation, reflection coefficient, wavelet.

Using the same concept for the processes 102 mentioned the disclosure, any new process 102 (or software) can be integrated in an existing workflow 100 by clearly specifying its inputs/outputs and connecting the new process 102 (or software) to the existing workflow 100. In typical implementations, model dependency is accounted for by sharing, when applicable, similar objects (for example, with similar inputs and outputs) between various models. Therefore consistency is preserved since the inputs for any of these models, when applicable, are computed and deducted from the outputs of other models within the same workflow (dependency). Also, data utilization is maximized to constrain, as much as possible, a models' outputs to available data to reduce uncertainties while using these models for prediction.

In some implementations, fundamental modeling components as well as dependencies (for example, with particular inputs and outputs) to form a composite model are as follows:

Structural Modeling

The objective of structural modeling is to define the syndepositional deformation which has a major influence on reservoir quality & heterogeneity as well as post-depositional deformation which controls entrapment. The structural modeling component of the workflow 100 involves the construction of a robust three dimensional (3D) structural framework through the integration of several data types. Some of the input data include geological markers, horizon grids, faults, and fractures. Seismic and microstructural data (core, logs) are used as input to structural modeling. Major geological zones are defined in the structural framework for subsequent detailed stratigraphic modeling at a finer layering scale.

Hard Input Data examples:
Model area of interest (AOI),
Top and base reservoir reference grids,
Well deviation surveys,
Geological markers,
Fault network (for example, fault sticks, polygons, and planes),
Fracture properties (for example, density and orientation), and
Fluid contacts (for example, oil/water contact (OWC), gas/water contact (GWC) oil/tar contact (OTC), etc.).

Soft Input Data examples:
Fracture and fault interpretation based on engineering dynamic data, and
Uncertainty related to top and base reservoir depth.

Output Data examples:
External geometry, and
Internal bodies.

Stratigraphic Modeling

Stratigraphic modeling covers process-based depositional and diagenetic modeling. Major controls on reservoir quality like sediment transport, erosion/reworking and fluid-driven overprint during burial are modelled in 3D and in time. Process-based modelling differs from geostatistical modeling which is based on the interpolation between known data points (wells). Stratigraphic modeling defines source rock distribution, migration pathways and reservoir parameters (rock properties, architecture, and heterogeneity) based on the development of depositional environments.

Hard Inputs Data examples:
Stratigraphic succession (for example, formations, thicknesses) from well and seismic information within sequence stratigraphic framework,
Rock properties (for example, log, cuttings, core formation age (for example, relative, absolute) from biostratigraphy, radiometric age dating (for example, Uranium/Lead ratio (U/Pb)) and sequence stratigraphy (correlation).
Total Organic Carbon content to define the potential source rock, and
Paleo-temperature data from thermo-chronology (for example, apatite & zircon fission track and Uranium/Thorium ratio (U/Th) data).

Soft Inputs Data examples:
Subsidence uplift from backstripping (1D) and isostatic/flexural inverse basin modeling (2D or 3D),
Paleo-water depths from depositional facies, seismic data and fossil content,
Eustatic sea-level from seismic interpretation, isotope stratigraphy (for example, core), and
Sediment input and production from mass balancing and modern environments.

Output Data examples:
Lithology 3D grid, and
Thickness 3D grid.

Petroleum Systems Modeling

Petroleum systems analysis has become an integral discipline in assessing the hydrocarbon potential of a given basin. The main components of a petroleum system are source, reservoir, trap, seal, migration, and timing, all of which have to be evaluated individually and collectively. Petroleum systems modeling, though focused on the source rock component of the petroleum system, aims at providing a calibrated earth model tying all the data and predicting the final output which is the composition and phase of the hydrocarbon product found at the trap. Non-source petroleum system components are equally looked at and evaluated in order to describe and model the petroleum migration journey from source to trap with the objective of quantifying hydrocarbon types, migration directions and timing. Petroleum systems modeling can no longer be considered as a complementary tool in petroleum exploration; as it is the only available exploratory tool to accurately describe the real earth model. Addressing fluid movements, maturity, temperature and pressure variations in the subsurface can only be assessed in a 3-Dimensional domain.

The source-component is evaluated by the quantity and quality of the source rock presence and organic richness, thickness, aerial coverage, thermal maturity and temperature, and pressure history of the geologic strata. The non-source components are evaluated for reservoir, seal and trap integrity utilizing existing well and seismic data that are peculiar to the basin under evaluation. A real earth model is then constructed in three dimensions (3D) utilizing the input data for all the petroleum system components. Additionally, structural and lithological facies maps representing each component are stratigraphically stacked, taking into considerations episodes of unconformities, burial/erosion/non-deposition, faulting/structural deformation, depositional environments and hydrocarbon generation, expulsion and migration throughout the geologic history of the basin.

The 3D model is subsequently forward-modeled using numerical methods to predict the burial and thermal history of the stratigraphic layers. Finally, the output is validated by the present-day hydrocarbon composition and thermal maturity of the discovered and produced hydrocarbons. Additionally, the reservoir, seal and trap properties (for example, viscosity, column height, Gas Oil Ratio (GOR) and phase) are also validated with the obtained data from the newly drilled wells (for example, test, log, core and seismic data).

Petroleum System Modeling involves critical elements of a petroleum system that is the source, carrier, reservoir, trap and seal. The time dependence of these processes/elements in basin history are very important for successful petroleum exploration and production. For instance, oil generation and migration post-dating trap formation will most likely lead to finding oil/gas accumulations if migration route is suitable and if the structural closure is preserved by a seal.

Hard Input Data examples:
All outputs of stratigraphic modeling.
Soft Input Data examples:
Kinetics of petroleum generation,
Assumptions of saturation thresholds of generated hydrocarbons (for example, 20% of available pore space) for expulsion from source rock.
Assumptions of fluid flow of generated hydrocarbons in carrier rocks on a basin scale from source to trap.
Kinetics of thermal maturation (for example, vitrinite reflectance).
Paleo and present-day heat flow.
Assumptions on paleo-surface temperatures.
Assumptions of matrix thermal conductivity for each rock unit.
Output Data examples:
Porosity, temperature and pressure evolution through time for each formation,
Hydrocarbon generation from the source rock through time,
Source rock thermal maturity through time,
Hydrocarbon migration paths, and
Hydrocarbon entrapment, loss through time, or a combination of both hydrocarbon entrapment and loss through time.

With respect to Petroleum System Modeling, the calibration of the model outputs is typically conducted based on computed values of temperature, pressure, and thickness of a given layer against measured values. The same is also true and more powerful for comparison of thermal maturity prediction versus measured thermal maturity. Thermal maturity is a more powerful calibration parameter as it (thermal maturity) has recorded in its memory the time-temperature exposure of the hydrocarbon source rock throughout the burial history. Thermal maturity can be decomposed into time and burial depth (which determines burial temperatures). So, good correlation (for example, an acceptable match) between a measured and modeled thermal maturity will most of the time lead to very good calibration of the model.

Each input parameter in the Petroleum System Modeling module can be a single, independent data point (for example, kerogen type or sediment water temperature) or variable data points that can be represented as a map such as Total Organic Carbon Content (TOC) given in weight % of the rock, Hydrogen Index (HI) as 100*the ratio of pyrolyzable HCs to TOC, or heat flow. The output parameters can be validated and optimized with measured data such as temperature, organic maturity, or American Petroleum Institute gravity. If a match between the modeled and measured data is weak, input parameters are modified accordingly until the match is reasonable. The same workflow is adjusted once again when the overall petroleum system output models do not tie with the other output parameters from other modules such as the stratigraphic, structural, and fluid flow. Therefore, the adjustment is dynamic and multi-directional as it is calibrated from within but, at the same time, it is also modified when external model parameters are revised.

Fluid Flow Modeling

The objective of fluid flow modeling is to simulate the fluid movement within the pore system once we start reservoirs production. Communicating reservoirs must be simulated within the same model to account for this communication. Otherwise, one numerical model per reservoir is needed to avoid the fluid flow simulation in non-flowing zones, which will minimize required CPU time of the simulation).

Hard Inputs Data example:
Wells location,
Production rates, and
Injection rates.
Soft Inputs Data example:
Relative permeability curves,
Capillary pressure curves,
Fault location/conductivity,
Lithology distribution,
Porosity distribution,
Permeability distribution, and
Reservoir top structure.
Output Data examples:
Bottom hole pressure (BHP) to be compared to BHP from Modular Formation Dynamics Tester (MDT),
Bottom hole temperature (BHT) to be compared to BHT from MDT,
Hydrocarbon rates to be compared to the rates from flow meter,
Water cut to be compared to the water cut from water cut meter,
Fluid saturation grid to be used as input for the petro-elastic modeling, and
Fluid pressure grid to be used as input for the petro-elastic modeling.

Petro-Elastic Modeling

Petro-elastic modeling (PEM) represents a vital step in the workflow 100 to calculate elastic properties from the rock properties defined in the 3D geocellular model. The main objective of PEM is to simulate and quantify a synthetic seismic response based on a pre-defined rock physics model and reservoir fluid properties. The rock physics model, which is calibrated to logs, cores, and measurements done in laboratories, provides the link between the elastic parameters and reservoir rock and fluid properties. The PEM, which is geologically consistent with input data and geological concepts used to construct the 3D geological model, becomes the foundation for seismic amplitude modeling and eventually the translation of seismic inversion elastic properties to rock properties.

The petro-elastic model simulates the seismic response of the saturated medium from rock and fluid properties while iteratively drawing from subcomponent models such as are the Geological Model, Petrophysics Model, Reservoir Simulation, Rock and Fluid Physics Model, and Time-lapse rock-fluid physics templates. The petro-elastic model uses conventional existing rock physics models calibrated to well log data measurements. The petro-elastic model simulates the elastic parameters which govern wave propagation, rock and fluid properties which govern fluid flow. Conventional simulation properties such as pressure, fluid density, fluid saturations and effective porosity, are used to calculate the effective acoustic response of the fluids. This is then combined with the acoustic response of the rocks (both frame and minerals) to give the overall acoustic response of the reservoir. The acoustic response is calculated and output for each active grid cell in the simulation model. The rock physics model is often composed of empirical laws calibrated to laboratory measurements and analytical formulas. Fluid substitutions performed are based on modified Gassmann equations.

Hard Input Data examples:
Well logs (porosity, lithology, permeability, water saturation, etc.),
Petrophysical Core measurements,
Velocity of compressional wave (Vp), velocity of shear wave (Vs), and Vp/Vs is the ratio of the P-wave to S-wave,
Young's modulus, and
Fluid Pressure, Volume Temperature (PVT) measurements.

Soft Input Data examples:
Rock physics templates,
Lithology distribution,
Porosity/Permeability distribution,
Reservoir top structure, and
Uncertainty bounds on input data (possible use of multiple PEMs).

Output Data examples:
Reflectivity.

Forward Seismic Modeling

Forward seismic modeling is used to model and predict the seismic response based on a known 3D geological model. A number of forward modeling techniques exist but some can be very computationally expensive. Therefore, a simple 1D convolution-based forward modeling technique, with relatively fast computation times, is the technique of choice to generate the synthetic seismic cube.

At each column of cells in the 3D geological acoustic impedance model, a reflectivity series is computed based on the AI contrast at geological interfaces. Then a synthetic seismic trace is generated by convolving the reflection coefficients with a zero-phase wavelet extracted from the acquired 3D seismic survey.

The purpose of forward seismic modeling is to correctly image the structure in time and depth and, second, to correctly characterize the amplitudes of the reflections. Assuming that the amplitudes are accurately rendered, a range of additional features can be derived and used in interpretation, most commonly referred to as seismic attributes. Attributes can be obtained from typical post-stack seismic data volumes, and these are the most common types, while additional information can be obtained from attributes of the individual seismic traces prior to stacking, in a pre-stack analysis. The most common of these is the variation of amplitude versus offset (AVO) it means amplitude versus offset, which is often used as an indicator of fluid type. The interpretation of any attribute is non-unique, and calibration to well data is required to minimize the ambiguities present. Pre-stack analysis of acquired seismic data is carried out to identify seismic amplitude anomaly regions and correlate them to rock properties and fluid type stored in the 3D geological model.

Hard Input Data examples:
Sonic and Density Well Logs,
Sidewall and Conventional Core,
Borehole Seismic Data,
Structural Grids, and
Prestack and Post Stack seismic volumes and gathers.

Soft Input Data examples:
Acoustic Impedance Logs,
Seismic wavelet,
Synthetic traces, and
Wavelet Algorithms.

Output Data examples:
Sparse-Spike deconvolution,
Constrained recursive inversion,
Low-frequency 3D acoustic impedance model, and
3D inverted acoustic impedance model.

From a mathematical point of view, in some implementations, the composite forward modeling can be represented by the following expression:

$$S=F(P),$$

where:
$P \in \mathcal{R}^n$: the set of parameters to be optimized (n: is the total number of parameters),
$S \in \mathcal{R}^m$: the set of simulation results to be compared to the observation (m: is the total number of observation), and
$F: \mathcal{R}^n \rightarrow \mathcal{R}^m$: the non-linear operator describing the various processes involved in the workflow 100.

Inverse Modeling

To solve an inverse problem, an objective function must be defined as described above to measure a mismatch between simulation results and observations. A challenge faced in solving inverse problems is the choice and the implementation of a global optimization technique to minimize the objective function. In some implementations, global optimization algorithms can be broadly classified into two categories: 1) stochastic and 2) deterministic approaches. The following sections provide a brief review of some of the existing global optimization algorithms.

Stochastic Global Optimization

Stochastic optimization techniques have been successfully applied to a wide variety of problems in science and engineering. These techniques have been widely used and may help in the cases when enumerative methods can be expensive or when the optimization problems involve too many variables. Many real world problems often involve uncertainty with respect to some of the parameters and may not have accurate problem data. Stochastic techniques can be of great help when optimization problems involve some uncertainty or randomness, or when the problem does not have an algebraic formulation.

Stochastic global optimization methods randomly search for a global optimum over a domain of interest. These methods typically rely on statistics to prove convergence to a global solution. According to the stochastic techniques, the more time spent searching for the global optimum, the greater the probability that the global optimum has been reached. The advantage of these methods is that they do not need a specific structure for a problem being solved. One disadvantage is that they often cannot handle highly constrained optimization problems. These methods offer no bounds on a solution. Some methods include: Simulated annealing, Tableau search, Pursuit search and Genetic algorithms. While other stochastic algorithms exist, only selected stochastic optimization methods are discussed here.

Simulated Annealing

Simulated annealing makes a comparison between the process of physical annealing and solving combinational optimization problems. At any iteration of the algorithm, the current solution is randomly changed to create an alternate solution in the neighborhood of the current solution. The current solution is replaced with the new solution if the objective function value for the new solution is better than the current solution. On the other hand, the current solution is replaced by the new solution based on some probability function if the objective function value for the new solution is worse than the current solution. The reason behind moving to an inferior solution is to prevent the search from being trapped in a local solution. At the beginning of the search, there is a correspondingly higher chance of uphill moves which reduces significantly later on in the search process as the probability reduces to zero.

Genetic Algorithms

Genetic algorithms are particular classes of evolutionary algorithms which deal with the techniques those are analogous to concepts of evolutionary biology such as mutation, inheritance, and recombination. Genetic algorithms represent a popular stochastic optimization approach in determining global solutions to optimization problems. The main difference between genetic algorithms and various other random search techniques is that these algorithms work with a population of possible candidate solutions to the problem as opposed to one solution. The algorithm iterates by simultaneously moving multiple candidate solutions from the current population towards a global solution. Starting from a totally random population of individuals, the algorithm iterates by selecting potential candidates from the current population for modification (mutation) and are combined (cross-mated) to form a new population. The above-described algorithms use some fitness functions to determine the quality of any proposed solution, thereby rejecting those solutions with low fitness value.

Deterministic Global Optimization

As opposed to stochastic methods, deterministic global optimization methods can guarantee optimal solutions within a specified tolerance, where this tolerance is the difference between the objective function value of the true global optimum point and that of the solution obtained. Deterministic global optimization techniques can explicitly handle constrained optimization problems, and therefore are often favorable compared to stochastic techniques.

These techniques require specific mathematical structure and hence can only be applied to specific problems in order to obtain global solutions. Identifying global solutions with arbitrary accuracy however presents significant advantages and challenges.

Deterministic methods are based on a theoretically-grounded exploration of the feasible space which in turn guarantees identification of global solution. These algorithms proceed by rigorously reducing the feasible space until the global solution has been found with prescribed accuracy. Converging sequences of valid upper and lower bounds are generated which approach the global solution from above and below. The rigorous generation of bounds on the optimal solution is a significant pan of deterministic global optimization and this usually requires generation of convex function relaxations to non-convex expressions. Branch-and-Bound and Outer Approximation methods are some of the most commonly used deterministic global optimization algorithms for solving non-convex non-linear programming problems.

In some implementations, a general process flow consistent with FIGS. 1A & 1B, 2, 3 (see additional detail below), and 4 can include:

1. Set a global objective function value to zero to indicate no current mismatch between model simulation processes and data,
2. Structural Modeling 112a
    2.1. Prepare model parameters/inputs. The input data is generally obtained from interpretation of raw data measured in the field (for example, seismic data, geological field work, outcrop modeling, core description, log interpretation, and the like). An example of inputs used for executing a structural modeling simulation process can include, among others, structural controls, fault throw, fault position, and the like,
    2.2. Identify the input parameters to be optimized. Before starting the optimization and model update, a sensitivity analysis of the local objective function to a large set of the corresponding input parameters is conducted to reduce the number of input parameters. This calculation needs to be done for each process. Once the final set of input parameters is selected, the optimization process can be initiated by running the entire workflow (all the processes) several times to decide how to change the input parameters to reduce the global objective function.
    2.3. Run the structural modeling simulation process. Several outputs can be obtained from the execution of the structural modeling simulation process (for example, external basin geometry (2D maps), internal basin horizons (2D maps), and the like. Some of these outputs are quantitatively (for example, using the above-described objective function) compared to available log, core, seismic, and other measured data,
    2.4. Compare the simulation outputs to the corresponding data and compute a mismatch value (if present). A local objective function associated with the structural modeling simulation process is used to measure a mismatch value (if any) between the model outputs (here, the structural modeling simulation process) and the measured input data. The best model corresponds to a minimum of the objective function (for example, theoretically the model outputs would be equal to the measured data). In addition, to compute the local objective function value, upscaling/downscaling steps are usually required. The model outputs in this case (for example, external geometry and internal horizons) are given by 2D maps but the measured data could be 2D (for example, seismic data) and 1D (for example, log and core data),
    2.5. Update the global objective function by adding any model mismatch computed by the local objective function to the global objective function value,
    2.6. Send the simulation results to the optimizer for archiving. To optimize the global objective function, the simulation of all the processes must be completed to gather all the simulation results and decide on the new input parameters values. While waiting for all the simulations to be completed, the results of processes already simulated will be archived in memory.
    2.7. Prepare/send the model objects (for example, inputs and outputs) needed by other models to preserve the models dependency. For example, the model objects can be transmitted to a data structure associated with another model simulation process, stored in a database, or stored in another data structure, etc. as long as a particular model simulation process has access to the model objects if necessary. The model objects can be sent to other model simulation processes involved in the workflow to be used as inputs. In the illustrated example for structural modeling, basin external geometry data is sent the stratigraphic modeling process to compute an accommodation map input (for example, refer to FIG. 1A, data 110 for structural modeling 112*a* and inputs 104 for stratigraphic modeling 112*b*).

Figure 3:
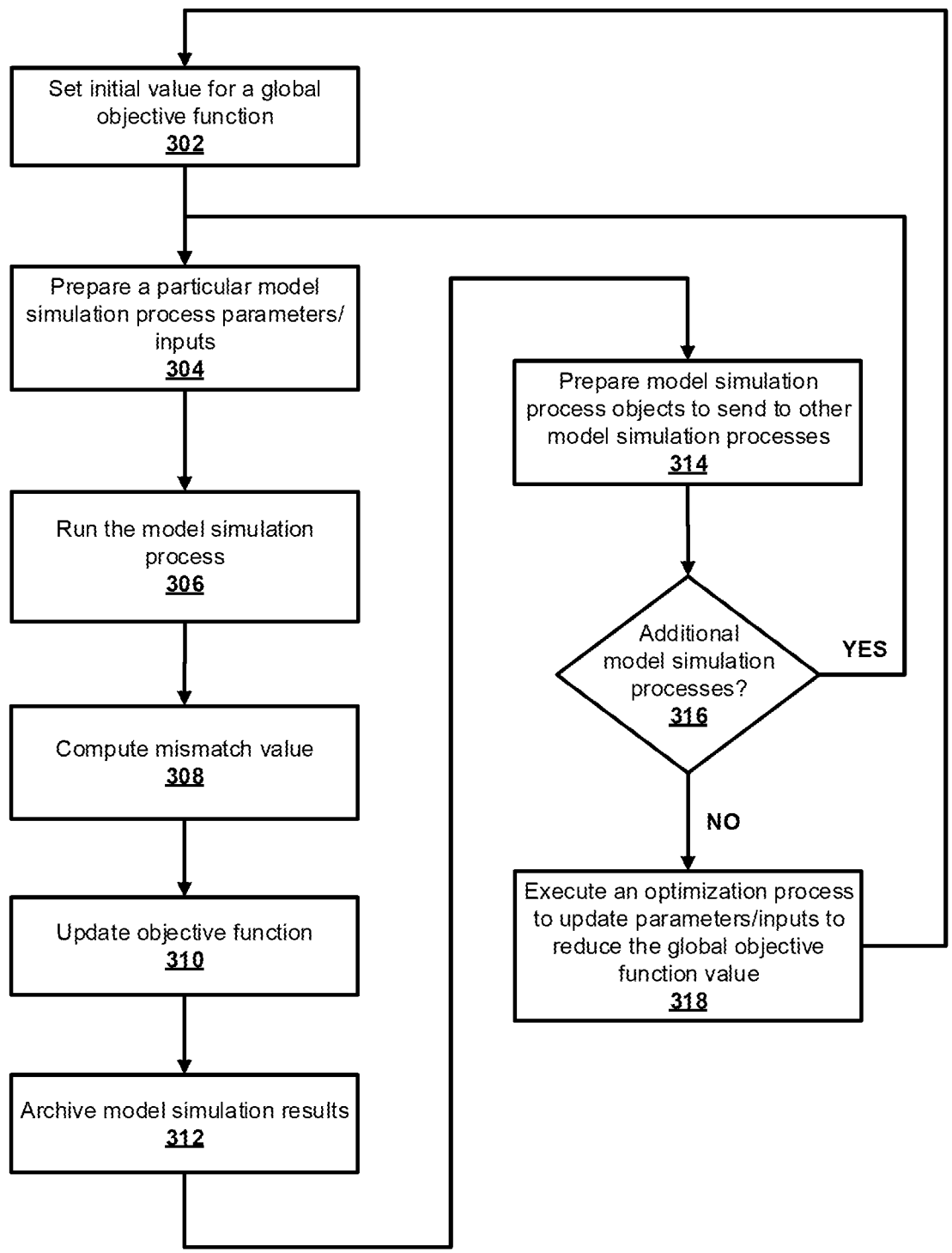
FIG. 3 represents a block diagram of a method for optimization of petroleum exploration and production activities using numerical modeling according to an implementation

Note that the following model simulation processes follow a similar workflow (even if not individually/explicitly described below) as described above with appropriate differences for each particular model simulation process input data requirements, outputs, etc. Refer to FIG. 3 for additional description of the workflow described in FIG. 1, 3. Stratigraphic Modeling 112*b*
    3.1. Prepare the model inputs. An example of inputs for the stratigraphic modeling simulation process can include, among others, paleo water depth, accommodation maps, transport coefficients, sediment supply, and the like. These inputs are generally obtained (as described above) from the interpretation of the raw data measured in the field. To maintain workflow consistency, accommodation map (2D) input is derived from basin external geometry (for example, output of the structural modeling simulation process described above),
    3.2. Identify the parameters to be optimized,
    3.3. Run the stratigraphic modeling simulation process. Several outputs can be obtained by running the stratigraphic modeling simulation process (for example, external geometry (2D grid), internal horizons (2D grid), lithology (3D grids over time), porosity (3D grids over time), permeability (3D grids over time), and the like),
    3.4. Compare the simulation outputs to the corresponding data and compute the mismatch value,
    3.5. Update the global objective function by adding any model mismatch computed by the local objective function to the global objective function value,
    3.6. Send the simulation results to the optimizer for archiving, and
    3.7. Prepare/send the model objects (for example, inputs and outputs) needed by other models to preserve the models dependency. In the illustrated example, data 110 (for example, external geometry, internal horizons, lithology, porosity, permeability, and the like) can be sent to the stratigraphic 112*b*, petroleum system 112*c*, fluid flow 112*d*, and petro-elastic 112*e* modeling simulation processes,
4. Petroleum System Modeling 112*c*
    4.1. Prepare the model inputs. Some inputs for the petroleum system modeling come from raw data interpretation and laboratory measurement (for example, source rock TOC and HI, source rock type of kerogen, source rock kinetic, basal heat flow, paleo water depth, sediment water air temperature, etc. To maintain the workflow consistency, some other inputs needed for petroleum system modeling can be imported from the stratigraphic modeling simulation process as they are available as outputs (for example, external geometry (2D grid), internal horizons (2D grid), lithology (3D grids over time), porosity (3D grids over time), and permeability (3D grids over time), and the like),
    4.2. Identify the parameters to be optimized,
    4.3. Run the petroleum system modeling simulation process. By running the petroleum system modeling simulation process, several outputs can be obtained (for example, pressure (3D grids over time), temperature (3D grids over time), saturation (3D grids over time), organic maturity, and the like),
    4.4. Compare the simulation outputs to the corresponding data and compute the mismatch value,
    4.5. Update the global objective function by adding any model mismatch computed by the local objective function to the global objective function value,
    4.6. Send the simulation results to the optimizer for archiving, and
    4.7. Prepare/send the model objects (for example, inputs and outputs) needed by other models to preserve the models dependency. In the illustrated example, data 110 (for example, pressure (3D grids over time), saturation (3D grids over time), temperature (3D grids over time), and the like) can be sent to the fluid flow modeling simulation process 112*d* illustrated in FIG. 1B,
5. Fluid Flow Modeling 112*d*
    5.1. Prepare the model inputs. Examples of inputs for the fluid flow modeling are include capillary pressure, relative permeability, external geometry, internal horizons, lithology (3D grid), porosity (3D grid), permeability (3D grid), and the like. Some of these inputs can be measured in the laboratory (for example, capillary pressure and relative permeability) and some of them are outputs from other model simulation processes (for example, primarily from stratigraphic modeling described above),
    5.2. Identify the parameters to be optimized,
    5.3. Run the fluid flow modeling simulation process. By running the fluid flow modeling process, several outputs can be obtained (for example, composition (3D grid), pressure (3D grid), saturation (3D grid), and the like),
    5.4. Compare the simulation outputs to the corresponding data and compute the mismatch value,
    5.5. Update the global objective function by adding any model mismatch computed by the local objective function to the global objective function value,
    5.6. Send the simulation results to the optimizer for archiving, and
    5.7. Prepare/send the model objects (for example, inputs and outputs) needed by other models to preserve the models dependency. In the illustrated example, data 110 (for example pressure (3D grids over time) and saturation (3D grids over time)) can be sent to the petro-elastic modeling simulation process,
6. Petro-Elastic Modeling 112*e*
    6.1. Prepare the model inputs. An example of inputs for the petro-elastic modeling include external geometry (2D grid), internal horizons (2D grid), lithology (2D grid), porosity (3D grid), pressure (3D grids over time), saturation (3D grids over time), and the like,
    6.2. Identify the parameters to be optimized,
    6.3. Run the petro-elastic modeling simulation process. By running the petro-elastic modeling process, several outputs can be obtained (for example, reflectivity (3D grid over time) and the like), 6.4. Compare the simulation outputs to the corresponding data and compute the mismatch value,
6.5. Update the global objective function by adding any model mismatch computed by the local objective function to the global objective function value,
6.6. Send the simulation results to the optimizer for archiving, and
6.7. Prepare/send the model objects (for example, inputs and outputs) needed by other models to preserve the models dependency. In the illustrated example, data 110 (for example reflectivity can be sent to the forward seismic modeling simulation process),
7. Forward Seismic Modeling 112f
7.1. Prepare the model inputs. Example of inputs for the forward seismic modeling are seismic wavelet and reflectivity,
7.2. Identify the parameters to be optimized,
7.3. Run the seismic amplitude modeling simulation process. By running the forward seismic modeling process, several outputs can be obtained (for example, seismic amplitude),
7.4. Compare the simulation outputs to the corresponding data and compute the mismatch value,
7.5. Update the global objective function by adding any model mismatch computed by the local objective function to the global objective function value. Note that in the illustrated example, this update of the global objective function is the final update prior to use of the optimizer to compute a new set of parameters that will reduce the global objective function value,
7.6. Send the simulation results to the optimizer for archiving, and
7.7. Prepare/send the model objects (for example, inputs and outputs) needed by other models (if applicable) to preserve the model's dependency. For example, if another processing loop is performed, the outputs of the forward seismic simulation modeling process can be passed back for use by other model simulation processes (for example, starting with the structural modeling simulation process 112a (if applicable)),
8. Model updating/running the optimization tool: The optimizer, depending on the adopted optimization technique, computes a new set of parameters that reduces the global objective function value. The optimization tool will predict (using to the model simulation process results already performed as described above) new values for the workflow parameters that reduces the mismatch between the model outputs and the measured data. In typical implementations, an optimal parameter set corresponds to the workflow with minimal local/global objective function values (the smallest overall mismatch values), and
9. Return above to set the global objective function value to zero to indicate no current mismatch between model simulation processes and data to rerun the above-described process loop. Looping through the workflow (for example, the workflow described with respect to FIGS. 1A & 1B) continues until an acceptable mismatch between the data and the simulation results is obtained (for example, based on a threshold (pre-set or dynamic) or other value).

Figure 2:
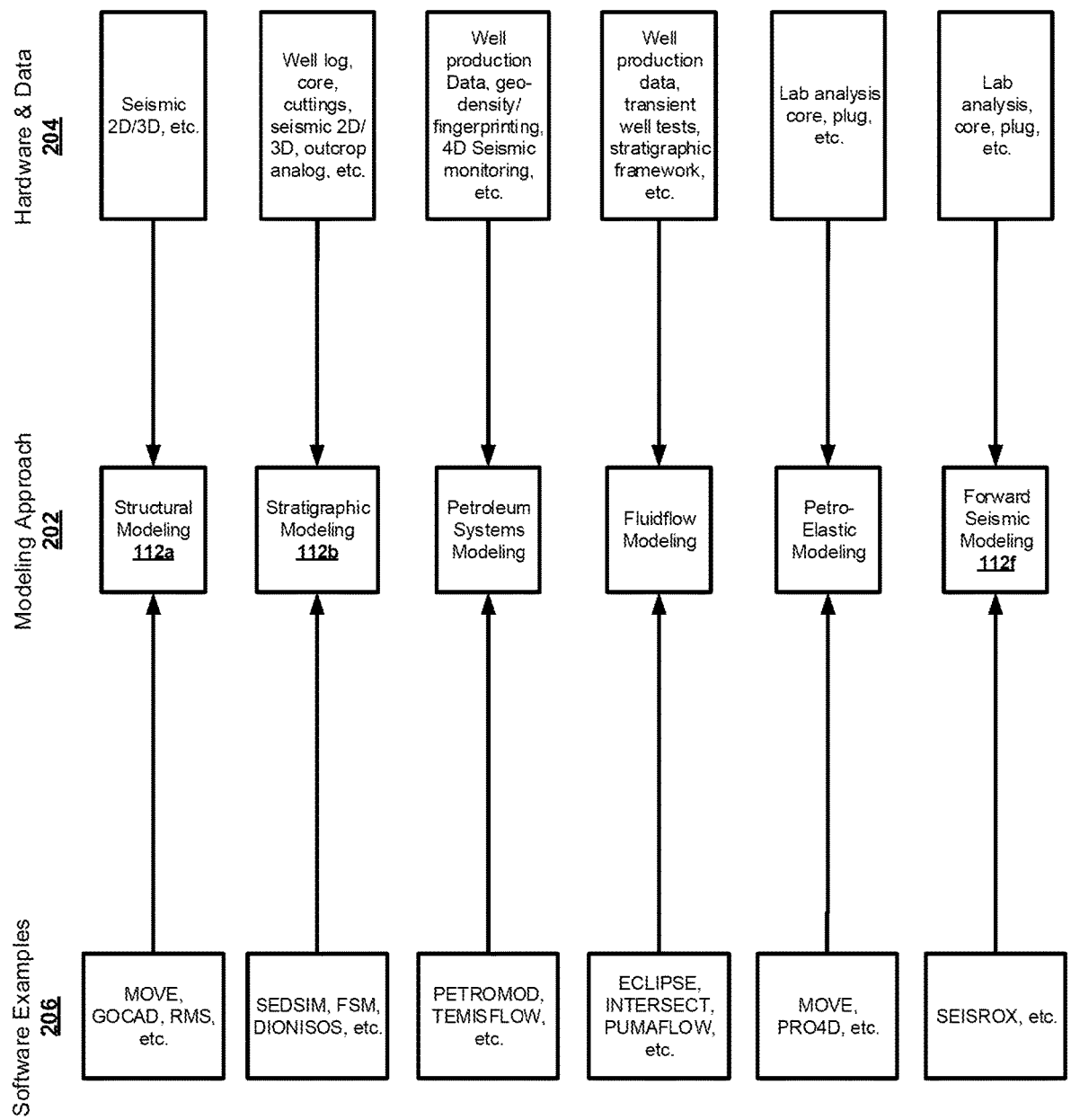
FIG. 2 illustrates a relationship between particular modeling approaches and associated hardware/data and software according to an implementation.

FIG. 2 illustrates a relationship between particular modeling approaches 202 (fundamental modeling component(s) 102) and associated hardware & data 204 and software examples 206 according to an implementation. For example, in some implementations, process stratigraphic modeling 112b is associated with hardware & data 204 (for example, well log core, seismic 2D/3D, etc.) and software examples, SEDSIM (CSIRO), FSM (Schlumberger), DIONISOS (Beicip-Franlab), as described below.

In some implementations, hardware & data 204 used for the various fundamental modeling component(s) 102 can include one or more of the following:
  Structural modeling: Seismic 2D/3D, etc.,
  Stratigraphic modeling: Well log, core, cuttings, seismic 2D/3D, outcrop analog, etc.,
  Petroleum System Modeling: Well production Data, geo-density/fingerprinting, 4D Seismic monitoring, etc.,
  Fluid Flow Modeling: Well production data, transient well tests, stratigraphic framework, etc.,
  Petro-Elastic Modeling: Lab analysis core, plug, etc., and
  Forward seismic modeling: lab analysis, core, plug, etc.

In some implementations, software 206 used for the various fundamental modeling component(s) 102 can include one or more of the following:
  Structural modeling: GOCAD (Paradigm), RMS (Roxar), PETREL (Schlumberger), JEWELSUITE (Baker Hughes), MOVE (Midland Valley),
  Stratigraphic modeling: SEDSIM (CSIRO), FSM (Schlumberger), DIONISOS (Beicip-Franlab),
  Petroleum System Modeling: PETROMOD (Schlumberger), TEMISFLOW (Beicip-Franlab),
  Fluid Flow Modeling: GIGAPOWER (Saudi Aramco), ECLIPSE (Schlumberger), INTERSECT (Schlumberger), PUMAFLOW (Beicip-Franlab)
  Petro-Elastic Modeling: MOVE Geo-mechanical Module (MVE), PRO4D (CGG), and
  Forward seismic modeling: SEISROX (Norsar).

Both the objective and optimization functions can include either proprietary or commercially available functions (or a combination of both) to account for workflow complexity.

As should be apparent to those of ordinary skill in the art, other implementations can include different hardware 204 or software 206. Other software consistent with this disclosure is also considered to be in the scope of this disclosure.

FIG. 3 represents a block diagram of a method 300 for optimization of petroleum exploration and production activities using numerical modeling according to an implementation. For clarity of presentation, the description that follows generally describes method 300 in the context of FIGS. 1A, 1B, 2, and 4. However, it will be understood that method 300 may be performed, for example, by any other suitable system, environment, software, and hardware, or a combination of systems, environments, software, and hardware as appropriate. In some implementations, various steps of method 300 can be run in parallel, in combination, in loops, or in any order. The following description of method 300 is consistent with the general process flow described in FIGS. 1A & 1B.

At 302, a global objective function value is initialized to an initial value (for example, zero or some other value) to indicate that no current mismatch exists between model simulation processes and parameter/input data. From 302, method 300 proceeds to 304.

At 304, model parameters/inputs are prepared for a particular model simulation process. The input data is generally obtained from interpretation of raw data measured in the field or from outputs of other model simulation processes to be used as inputs (for example, seismic data, geological field work, outcrop modeling, core description, log interpretation, and the like). An example of inputs used for executing a structural modeling simulation process (112a of FIG. 1A) can include, among others, structural controls, fault throw, fault position, and the like. From 304, method 300 proceeds to 306.

At 306, the particular model simulation process is executed. One or more outputs can be obtained from the execution of the particular model simulation process. For example, for the structural modeling simulation process, external basin geometry (2D maps), internal basin horizons (2D maps), and the like can be generated by the process' execution. From 306, method 300 proceeds to 308.

At 308, simulation outputs are compared to corresponding data used by the particular model simulation process to compute a mismatch value (if present) between the particular model simulation process and the measured data. For example, with respect to the structural modeling simulation process, a local objective function associated with the structural modeling simulation process is used to measure a mismatch value (if any) between the model outputs (here, the structural modeling simulation process) and the measured input data. The best model corresponds to a minimum of the objective function (for example, theoretically the model outputs would be equal to the measured input data). In addition, to compute the local objective function value, upscaling/downscaling steps are usually required. The model outputs in this case (for example, external geometry and internal horizons) are given by 2D maps but the measured data could be 2D (for example, seismic data) and 1D (for example, log and core data). From 308, method 300 proceeds to 310.

At 310, the global objective function is updated by adding any model mismatch computed by the local objective function to the global objective function value. From 310, method 300 proceeds to 312.

At 312, the particular model simulation process results are transmitted to the optimizer to update the input parameter values allowing for a better match between simulation results and observed data. From 312, method 300 proceeds to 314.

At 314, model objects (for example, parameters/inputs and outputs) from the particular model simulation process are prepared to send to other model simulation processes to preserve model dependency. For example, the model objects can be transmitted to a data structure associated with another model simulation process, stored in a database, or stored in another data structure, etc. as long as a particular model simulation process has access to the model objects if necessary. The model objects can be sent to other model simulation processes involved in the workflow to be used as inputs. For example, in the illustrated example for structural modeling in FIG. 1A, basin external geometry data is sent the stratigraphic modeling process to compute an accommodation map input (refer to FIG. 1A, data 110 for structural modeling 112a and inputs 104 for stratigraphic modeling 112b). From 314, method 300 proceeds to 316.

At 316, a determination is made as to whether there are additional model simulation processes to execute. If it is determined that there are additional model simulation processes to execute, method 300 proceeds back to 304 to execute the additional model simulation process. Model objects are also sent to the additional model simulation process (if required) to preserve model dependency. If it is determined that there are not additional model simulation processes to execute, method 300 proceeds to 318.

At 318, an optimization process is executed to predict (according to the model simulation process results already performed) new values for the workflow parameters/inputs that reduces any mismatch between the model outputs and the measured data. In typical implementations, an optimal parameter set corresponds to the workflow with minimal local/global objective function values (the smallest overall mismatch values). After 318, method 300 returns back to 302 to set the global objective function value to zero to indicate no current mismatch between model simulation processes and data to rerun the above-described process loop. Looping through the workflow (for example, the workflow described with respect to FIGS. 1A & 1B) continues until an acceptable mismatch between the data and the simulation results is obtained (for example, based on a threshold (pre-set or dynamic) or other value).

Figure 4:
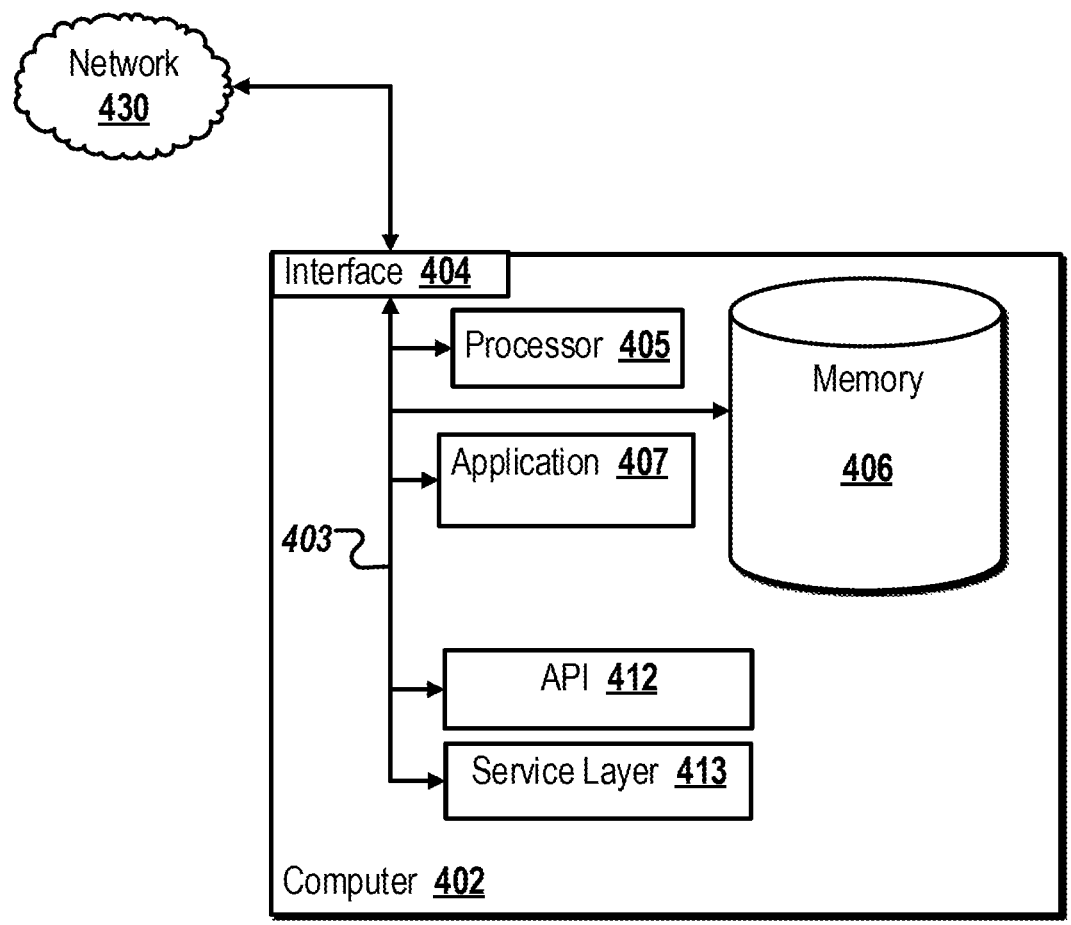
FIG. 4 is a block diagram of an exemplary computer system used to provide computational functionalities associated with described algorithms, methods, functions, processes, flows, and procedures as described in the instant disclosure, according to an implementation.

FIG. 4 is a block diagram of an exemplary computer system 400 used to provide computational functionalities associated with described algorithms, methods, functions, processes, flows, and procedures as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a GUI.

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, business intelligence (BI) server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430 (whether illustrated or not). Generally, the interface 404 comprises logic encoded in software or hardware (or a combination of software and hardware) and operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a memory 406 that holds data for the computer 402 or other components (or a combination of both) that can be connected to the network 430 (whether illustrated or not). For example, memory 406 can be a database storing data consistent with this disclosure. Although illustrated as a single memory 406 in FIG. 4, two or more memories may be used according to particular needs, desires, or particular implementations of the computer 402 and the described functionality. While memory 406 is illustrated as an integral component of the computer 402, in alternative implementations, memory 406 can be external to the computer 402.

The application 407 is an algorithmic software engine providing functionality according to particular needs, desires, or particular implementations of the computer 402, particularly with respect to functionality described in this disclosure. For example, application 407 can serve as one or more components, modules, applications, etc. Further, although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, a computer system containing computer 402, each computer 402 communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Described implementations of the subject matter can include one or more features, alone or in combination.

For example, in a first implementation, a computer-implemented method, comprising: initializing a global objective function to an initial value; preparing input data for a particular model simulation process of a plurality of model simulation processes; executing the particular model simulation process using the prepared input data; computing a mismatch value by using a local function to compare an output of the particular model simulation process to corresponding input data for the particular model simulation process; sending model objects associated with the particular model simulation process to another model simulation process; and executing an optimization process to predict new values for input data to reduce the computed mismatch value.

The foregoing and other described implementations can each optionally include one or more of the following features:

A first feature, combinable with any of the following features, wherein the global objective function is represented by:

$$J(P) = \frac{1}{2}\sum_{i=1}^{np} w_i J_i^L(P),$$

where:
  $J_i^L(P)$ is the local objective function, and
  $w_i$ is a weighting factor used to account for uncertainty of a data measurement and normalized to a value between zero and one.

A second feature, combinable with any of the previous or following features, wherein the input data is obtained from interpretation of raw measured data or from an output of another model simulation process.

A third feature, combinable with any of the previous or following features, wherein the local objective function is based on the Euclidian Norm and defined as:

$$J_i^L(P) = \frac{1}{2}\|O_i^L - S_i^L\|_E^2 = \frac{1}{2}\|O_i^L - F_i^L(P)\|_E^2,$$

where:
  $O_i^L \in \mathcal{R}^m$ is the set of observation for the local process number i.

A fourth feature, combinable with any of the previous or following features, wherein the local objective function is uses a least square formulation using an $L^2$ Norm:

$$J_i^L(P) = \frac{1}{2} \sum_{j=1}^{m} \frac{(O_{ij}^L - F_{ij}^L(P))^2}{\sigma_{ij}^2},$$

where:

$\sigma_{ij}$ is a real value that represents the standard deviation on the data measurement.

A fifth feature, combinable with any of the previous or following features, comprising updating the global objective function value with the computed mismatch value associated with the particular model simulation process.

A sixth feature, combinable with any of the previous or following features, comprising determining whether there is an additional model simulation process to execute in the workflow.

In a second implementation, a non-transitory, computer-readable medium storing one or more instructions executable by a computer to: initialize a global objective function to an initial value; prepare input data for a particular model simulation process of a plurality of model simulation processes; execute the particular model simulation process using the prepared input data; compute a mismatch value by using a local function to compare an output of the particular model simulation process to corresponding input data for the particular model simulation process; send model objects associated with the particular model simulation process to another model simulation process; and execute an optimization process to predict new values for input data to reduce the computed mismatch value.

The foregoing and other described implementations can each optionally include one or more of the following features:

A first feature, combinable with any of the following features, wherein the global objective function is represented by:

$$J(P) = \frac{1}{2} \sum_{i=1}^{np} w_i J_i^L(P),$$

where:

$J_i^L(P)$ is the local objective function, and $w_i$ is a weighting factor used to account for uncertainty of a data measurement and normalized to a value between zero and one.

A second feature, combinable with any of the previous or following features, wherein the input data is obtained from interpretation of raw measured data or from an output of another model simulation process.

A third feature, combinable with any of the previous or following features, wherein the local objective function is based on the Euclidian Norm and defined as:

$$J_i^L(P) = \frac{1}{2} \|O_i^L - S_i^L\|_E^2 = \frac{1}{2} \|O_i^L - F_i^L(P)\|_E^2,$$

where:

$O_i^L \in \mathcal{R}^m$ is the set of observation for the local process number i.

A fourth feature, combinable with any of the previous or following features, wherein the local objective function is uses a least square formulation using an $L^2$ Norm:

$$J_i^L(P) = \frac{1}{2} \sum_{j=1}^{m} \frac{(O_{ij}^L - F_{ij}^L(P))^2}{\sigma_{ij}^2},$$

where:

$\sigma_{ij}$ is a real value that represents the standard deviation on the data measurement.

A fifth feature, combinable with any of the previous or following features, comprising one or more instructions to update the global objective function value with the computed mismatch value associated with the particular model simulation process.

A sixth feature, combinable with any of the previous or following features, comprising one or more instructions to determine whether there is an additional model simulation process to execute in the workflow.

In a third implementation, a computer-implemented system, comprising: a computer memory; at least one hardware processor interoperably coupled with the computer memory and configured to: initialize a global objective function to an initial value; prepare input data for a particular model simulation process of a plurality of model simulation processes; execute the particular model simulation process using the prepared input data; compute a mismatch value by using a local function to compare an output of the particular model simulation process to corresponding input data for the particular model simulation process; send model objects associated with the particular model simulation process to another model simulation process; and execute an optimization process to predict new values for input data to reduce the computed mismatch value.

The foregoing and other described implementations can each optionally include one or more of the following features:

A first feature, combinable with any of the following features, wherein the global objective function is represented by:

$$J(P) = \frac{1}{2} \sum_{i=1}^{np} w_i J_i^L(P),$$

where:

$J_i^L(P)$ is the local objective function, and $w_i$ is a weighting factor used to account for uncertainty of a data measurement and normalized to a value between zero and one.

A second feature, combinable with any of the previous or following features, wherein the input data is obtained from interpretation of raw measured data or from an output of another model simulation process.

A third feature, combinable with any of the previous or following features, wherein the local objective function is based on the Euclidian Norm and defined as:

$$J_i^L(P) = \frac{1}{2} \|O_i^L - S_i^L\|_E^2 = \frac{1}{2} \|O_i^L - F_i^L(P)\|_E^2,$$

where:

$O_i^L \in \mathcal{R}^m$ is the set of observation for the local process number i.

A fourth feature, combinable with any of the previous or following features, wherein the local objective function is uses a least square formulation using an $L^2$ Norm:

$$J_i^L(P) = \frac{1}{2}\sum_{j=1}^{m} \frac{(O_{ij}^L - F_{ij}^L(P))^2}{\sigma_{ij}^2},$$

where:
$\sigma_{ij}$ is a real value that represents the standard deviation on the data measurement.

A fifth feature, combinable with any of the previous or following features, configured to: update the global objective function value with the computed mismatch value associated with the particular model simulation process.

A sixth feature, combinable with any of the previous or following features, configured to determine whether there is an additional model simulation process to execute in the workflow.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   initializing a workflow of a plurality of model simulation processes, wherein the plurality of model simulation processes comprise, in order: structural modeling, stratigraphic modeling, petroleum system modeling, fluid flow modeling, petro-elastic modeling, and forward seismic modeling, wherein the model simulation process are associated with a plurality of workflow parameters, wherein each model simulation process is associated with a respective local objective function, and wherein the respective local objective functions combine to form a global objective function for the workflow;
   starting with a first model simulation process and for each of the plurality of model simulation processes in order:
   preparing input data for the model simulation process, wherein the prepared input data comprises at least one of raw measured data or an output of a previous model simulation process in the workflow;
   executing the model simulation process using the prepared input data;
   computing a mismatch value by using the respective local function to compare an output of the model simulation process to the raw measured data for the model simulation process;
   updating the global objective function with the computed mismatch; and
   sending the prepared input and the output of the model simulation process to a subsequent model simulation process in the workflow; and
   executing an optimization process to predict new values for at least one of the workflow parameters of the plurality of model simulation processes to reduce the value of the global objective function.

2. The computer-implemented method of claim 1, wherein
   the global objective function is represented by:

$$J(P) = \frac{1}{2} \sum_{i=1}^{n_p} w_i J_i^L(P),$$

where:
   $J_i^L(P)$ is the respective local objective function, and
   $w_i$ is a weighting factor used to account for uncertainty of a data measurement and normalized to a value between zero and one.

3. The computer-implemented method of claim 1, wherein the respective local objective function is based on the Euclidian Norm and defined as:

$$J_i^L(P) = \frac{1}{2} \|O_i^L - S_i^L\|_E^2 = \frac{1}{2} \|O_i^L - F_i^L(P)\|_E^2,$$

where:
   $O_i^L \in \mathcal{R}^m$ is a set of observations for the model simulation process number i of the plurality of interdependent model simulation processes,
   $S_i^L \in \mathcal{R}^m$ is a set of simulation results for the model simulation process number i, and
   $F_i^L: \mathcal{R}^n \to \mathcal{R}^m$ is a non-linear operator describing the plurality of model simulation processes.

4. The computer-implemented method of claim 1, wherein the respective local objective function uses a least square formulation using an $L^2$ Norm:

$$J_i^L(P) = \frac{1}{2} \sum_{j=1}^{m} \frac{(O_{ij}^L - F_{ij}^L(P))^2}{\sigma_{ij}^2},$$

where:
   $\sigma_{ij}$ is a real value that represents the standard deviation on a data measurement,
   $m_i$ is the number of measurement for the model simulation process number i of the plurality of interdependent model simulation processes, and
   $F_{ij}^L: \mathcal{R}^n \to \mathcal{R}^{m_i}$ is a non-linear operator describing the plurality of model simulation processes.

5. A non-transitory, computer-readable medium storing one or more instructions executable by a computer to:
   initialize a workflow of a plurality of model simulation processes, wherein the plurality of model simulation processes comprise, in order: structural modeling, stratigraphic modeling, petroleum system modeling, fluid flow modeling, petro-elastic modeling, and forward seismic modeling, wherein the model simulation process are associated with a plurality of workflow parameters, wherein each model simulation process is associated with a respective local objective function, and wherein the respective local objective functions combine to form a global objective function for the workflow;
   starting with a first model simulation process and for each of the plurality of model simulation processes in order:
   prepare input data for the model simulation process input data for the model simulation process, wherein the prepared input data comprises at least one of raw measured data or an output of a previous model simulation process in the workflow;
   execute the model simulation process using the prepared input data;
   compute a mismatch value by using the respective local function to compare an output of the model simulation process to the raw measured data for the model simulation process;

update the global objective function with the computed mismatch; and add the computed mismatch to the global objective function;

send the prepared input and the output of the model simulation process to a subsequent model simulation process in the workflow; and execute an optimization process to predict new values for at least one of the workflow parameters of the plurality of model simulation processes to reduce the value of the global objective function.

6. The non-transitory, computer-readable medium of claim 5, wherein the global objective function is represented by:

$$J(P) = \frac{1}{2}\sum_{i=1}^{n_p} w_i J_i^L(P),$$

where:
$J_i^L(P)$ is the respective local objective function, and
$w_i$ is a weighting factor used to account for uncertainty of a data measurement and normalized to a value between zero and one.

7. The non-transitory, computer-readable medium of claim 5, wherein the local objective function is based on the Euclidian Norm and defined as:

$$J_i^L(P) = \frac{1}{2}\|O_i^L - S_i^L\|_E^2 = \frac{1}{2}\|O_i^L - F_i^L(P)\|_E^2,$$

where:
$O_i^L \in \mathcal{R}^m$ is a set of observations for the model simulation process number i of the plurality of interdependent model simulation processes,
$S_i^L \in \mathcal{R}^m$ is a set of simulation results for the model simulation process number i, and
$F_i^L: \mathcal{R}^n \to \mathcal{R}^m$ is a non-linear operator describing the plurality of model simulation processes.

8. The non-transitory, computer-readable medium of claim 5, wherein the local objective function is uses a least square formulation using an $L^2$ Norm:

$$J_i^L(P) = \frac{1}{2}\sum_{j=1}^{m}\frac{(O_{ij}^L - F_{ij}^L(P))^2}{\sigma_{ij}^2},$$

where:
$\sigma_{ij}$ is a real value that represents the standard deviation on a data measurement,
$m_i$ is the number of measurement for the model simulation process number i of the plurality of interdependent model simulation processes, and
$F_{ij}^L: \mathcal{R}^n \to \mathcal{R}^{m_i}$ is a non-linear operator describing the plurality of model simulation processes.

9. A computer-implemented system, comprising:
a computer memory;
at least one hardware processor interoperably coupled with the computer memory and configured to:
initialize a workflow of a plurality of model simulation processes, wherein the plurality of model simulation processes comprise, in order: structural modeling, stratigraphic modeling, petroleum system modeling, fluid flow modeling, petro-elastic modeling, and forward seismic modeling, wherein the model simulation process are associated with a plurality of workflow parameters, wherein each model simulation process is associated with a respective local objective function, and wherein the respective local objective functions combine to form a global objective function for the workflow;

starting with a first model simulation process and for each of the plurality of model simulation processes in order:
prepare input data for the model simulation process, wherein the prepared input data comprises at least one of raw measured data or an output of a previous model simulation process in the workflow;
execute the model simulation process using the prepared input data;
compute a mismatch value by using the respective local function to compare an output of the model simulation process to the raw measured data for the model simulation process;
update the global objective function with the computed mismatch; and
send the prepared input and the output of the model simulation process to a subsequent model simulation process in the workflow; and execute an optimization process to predict new values for at least one of the workflow parameters of the plurality of model simulation processes to reduce the value of the global objective function.

10. The computer-implemented system of claim 9, wherein the global objective function is represented by:

$$J(P) = \frac{1}{2}\sum_{i=1}^{n_p} w_i J_i^L(P),$$

where:
$J_i^L(P)$ is the respective local objective function, and
$w_i$ is a weighting factor used to account for uncertainty of a data measurement and normalized to a value between zero and one.

11. The computer-implemented system of claim 9, wherein the local objective function is based on the Euclidian Norm and defined as:

$$J_i^L(P) = \frac{1}{2}\|O_i^L - S_i^L\|_E^2 = \frac{1}{2}\|O_i^L - F_i^L(P)\|_E^2,$$

where:
$O_i^L \in \mathcal{R}^m$ is a set of observations for the model simulation process number i of the plurality of interdependent model simulation processes,
$S_i^L \in \mathcal{R}^m$ is a set of simulation results for the model simulation process number i, and
$F_i^L: \mathcal{R}^n \to \mathcal{R}^m$ is a non-linear operator describing the plurality of model simulation processes.

12. The computer-implemented system of claim 9, wherein the local objective function is uses a least square formulation using an $L^2$ Norm:

$$J_i^L(P) = \frac{1}{2} \sum_{j=1}^{m} \frac{(O_{ij}^L - F_{ij}^L(P))^2}{\sigma_{ij}^2},$$

where:
- $\sigma_{ij}$ is a real value that represents the standard deviation on a data measurement,
- $m_i$ is the number of measurement for the model simulation process number i of the plurality of interdependent model simulation processes, and
- $F_{ij}^L : \mathcal{R}^n \to \mathcal{R}^{m_i}$ is a non-linear operator describing the plurality of model simulation processes.

13. The computer-implemented method of claim 1, wherein the respective local objective function is indicative of a mismatch between an output of the model simulation process and historical data associated with the model simulation process, and wherein the global objective function is indicative of a mismatch between an output of the workflow and historical data associated with the workflow.

* * * * *

UNITED STATES PATENT AND TRADEMARK OFFICE
CERTIFICATE OF CORRECTION

PATENT NO. : 10,713,398 B2
APPLICATION NO. : 15/162205
DATED : July 14, 2020
INVENTOR(S) : Mokhles Mustapha Mezghani et al.

Page 1 of 1

It is certified that error appears in the above-identified patent and that said Letters Patent is hereby corrected as shown below:

In the Claims

In Column 30, Line 57-58, Claim 5, please delete "input data for the model simulation process input data for the model simulation process," and insert -- input data for the model simulation process, --, therefor.

In Column 32, Line 45, Claim 8, please delete "function is uses a least" and insert -- function uses a least --.

In Column 32, Line 65, Claim 12, please delete "function is uses a least" and insert -- function uses a least --.

Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*